(No Model.) 2 Sheets—Sheet 1.

D. F. OLIVER.
DIRT SCRAPER.

No. 463,795. Patented Nov. 24, 1891.

Witnesses,

Inventor
Doctor F. Oliver
B. Dewey & Co
Attys (No Model.) 2 Sheets—Sheet 2.
D. F. OLIVER.
DIRT SCRAPER.
No. 463,795. Patented Nov. 24, 1891.
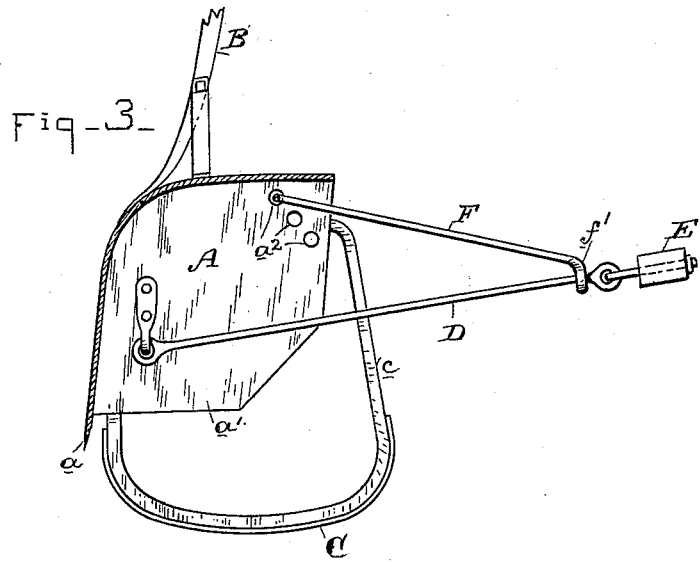
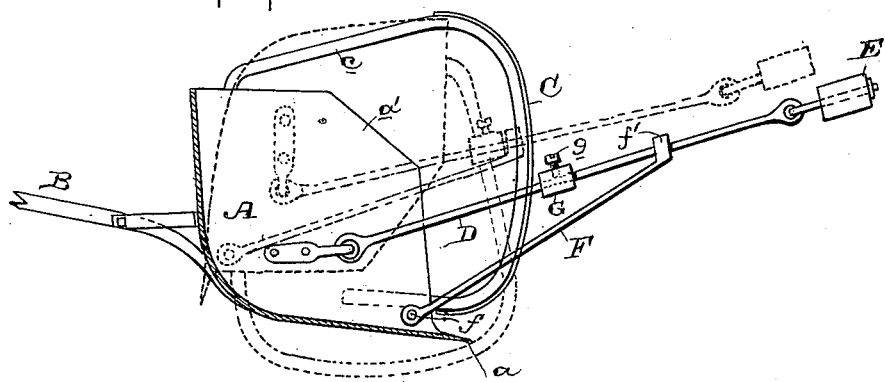

UNITED STATES PATENT OFFICE.

DOCTOR FRANKLIN OLIVER, OF OAKLAND, ASSIGNOR TO TRUMAN, HOOKER & CO., OF SAN FRANCISCO, CALIFORNIA.

DIRT-SCRAPER.

SPECIFICATION forming part of Letters Patent No. 463,795, dated November 24, 1891.

Application filed March 23, 1891. Serial No. 386,107. (No model.)

*To all whom it may concern:*

Be it known that I, DOCTOR FRANKLIN OLIVER, a citizen of the United States, residing at Oakland, Alameda county, State of California, have invented an Improvement in Dirt-Scrapers; and I hereby declare the following to be a full, clear, and exact description of the same.

My invention relates to that class of dirt-scrapers in which a bowl provided with end runners and a rearwardly-projecting handle is connected by pivoted links with a drag-bar, and is adapted to be turned over upon its runners to dump its load, said turning being limited by a suitable stop.

My invention consists in a novel stop for limiting the dump of the bowl, hereinafter fully described, and specifically pointed out in the claims.

The object of my invention is to provide a simple and effective stop for this purpose, one which can be fixed at a certain point or can be rendered adjustable to vary the limits to which the bowl can turn, as may be desired.

Figure 1:
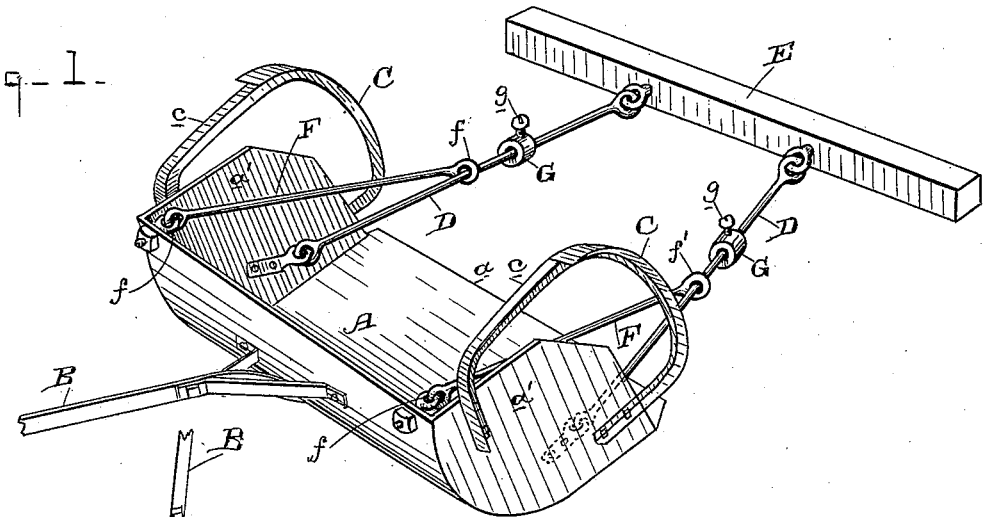
Figure 2:
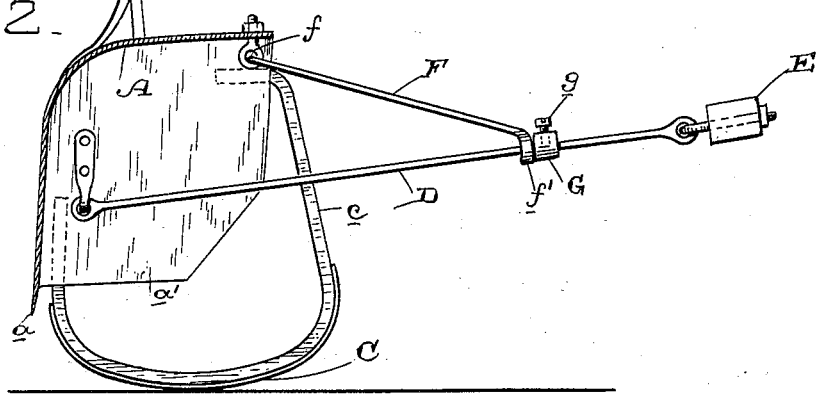

Referring to the accompanying drawings for a more complete explanation of my invention, Figure 1 is a perspective view of my dirt-scraper, showing it in its working position, ready to take and carry a load of dirt. Fig. 2 is a sectional view showing the bowl turned to dump its load and limited by the contact of the stop-links with the shoulders or collars on the draft-links. Fig. 3 is a view of a scraper, showing it turned and limited by the contact of the stop-links with the end connections of the draft-links and drag-bar. Fig. 4 is a view showing the stop-links arranged to be limited by collars placed back of them on the draft-links.

A is the bowl of the scraper, having at its front the usual bit $a$ and the ends $a'$. A handle B projects rearwardly from the bowl A. C are runners secured to the ends of the bowl by means of arms $c$.

D are the draft-links, the rear ends of which are connected with the ends of the bowl, and their forward ends are connected with the drag-bar E.

The general operation of a dirt-scraper of this character is as follows: To take a load, the handle is slightly raised, so that the bit of the bowl takes the ground to the depth desired. When the bowl is full, the handle is depressed and the bowl is dragged along on its own bottom, carrying the load. When the point is reached at which the load is to be dumped, the handle B is thrown upwardly and forwardly, whereby the bowl is turned over onto its runners C, and its bit $a$ is thereby raised from the ground and the load of dirt is discharged and spread over the surface by the bit $a$. Now it is obvious that in order to limit the turning movement of the bowl at the point desired, so that its bit shall be at a certain distance above the ground to spread the discharged dirt, and also to keep the handle B from being thrown too far forward and into the way of the horses, it is necessary to provide some stop to control this movement of the bowl. Heretofore this stop has consisted of a cross-bar extending above the bowl and between its ends and adapted to come in contact, when the bowl is dumped, with the draft-links D. My stop is of a different character and is much simpler, both in construction and in arrangement, as it does not interfere with the capacity of the bowl nor present an unsightly appearance. It consists of the following device: Connected to the scraper are the stop-links F, the forward ends of which have eyes or loops $f'$, which are fitted and adapted to slide upon the draft-links D. When the bowl is right side up, these links are drawn back upon the draft-links; but when dumped the stop-links F slide out on the draft-links D, and, as shown in Fig. 3, their loops or eyes, coming in contact with the end connections between the draft-links and drag-bar, arrest their further sliding movement, and thus the dump of the bowl is limited. Now in order to vary the limits of the dump of the bowl in order to arrange for different heights of the bit of the bowl above the ground, and thereby to spread the dirt over the ground according to the thickness of layer desired, the connections between the stop-links F and the bowl can be made adjustable. If a single stop limit is desired, the stop-links are connected in a single place, and are therefore not adjustable; but to make them adjustable their rear ends are fitted to any of a series of holes $a^2$ in the bowl ends $a'$.

By setting them in a forward hole their stopping effect will take place sooner, and the turning of the bowl will therefore be limited sooner. By setting them in a hole farther back the bowl will be allowed to turn farther. The construction thus far described shows the limiting function of the stop-links, and also that they can be rendered adjustable; but the form of construction which I now prefer and which involves the same stop-links is shown in Figs. 1 and 2. Instead of limiting the stop-links by the end connections of the draft-links with the drag-bar, they are limited on the draft-links by stop shoulders or collars, as follows: Upon said draft-links are suitable stop-shoulders. (Here represented by the collars G.) Now when the bowl is carrying its load, as shown in Fig. 1, the stop-links F are back on the links D and their forward ends are away from the collars G; but when the bowl is dumped, as in Fig. 2, the links F slide forward on the draft-links D until their forward ends are limited by the stop-collars G, and thereby the turning of the bowl is limited and its bit is held at the proper position above the ground, while its handle is prevented from being thrown too far forward. To render the stop mechanism adjustable in order to vary the dump of the bowl and the distance of the bit from the ground, whereby a layer of dirt of greater or less thickness may be spread over the ground, the collars G are made movable on the draft-links D by sliding back and forth thereon to vary their position, and said collars fixed in the position to which they are set by means of set-screws $g$.

In Fig. 4 I show the relative position of the stop-links and draft-links, so changed that the former are limited by the collars G, placed upon the draft-links at a point behind the forward ends of the stop-links.

Having thus described my invention, what I claim as new, and desire to secure by Letters Patent, is—

1. In a dirt-scraper having a turnable bowl and draft-links, the stop-links connected at their rear ends with the bowl and having their forward ends connected with the draft-links by a sliding connection, whereby when the bowl is dumped the stop-links slide on the draft-links and limit the dump of the bowl, substantially as herein described.

2. In a dirt-scraper and in combination with its turnable bowl and draft-links having suitable stops, stop-links connected at their rear ends to the bowl and having their forward ends sliding on the draft-links and arrested when the bowl is dumped by contact with the stops on the draft-links, substantially as herein described.

3. In a dirt-scraper and in combination with its turnable bowl and draft-links, the stop mechanism for limiting the dump of the bowl, consisting of the stop-links secured at their rear ends to the bowl and sliding at their forward ends on the draft-links, and stop-collars on said draft-links for limiting the sliding movement of the stop-links, substantially as herein described.

4. In a dirt-scraper and in combination with its turnable bowl and draft-links, the adjustable stop mechanism for limiting the dump of the bowl, consisting of the stop-links connected at their rear ends with the bowl and sliding at their forward ends on the draft-links, and the adjustable stop-collars G on the draft-links with which the forward ends of the stop-links are adapted to come in contact, substantially as herein described.

5. In a dirt-scraper, the combination of the bowl, the runners of said bowl, the draft-links, and the drag-bar, the stop-links connected at their rear ends to the bowl and having eyes or loops at their forward ends sliding on the draft-links, and stop shoulders or collars on said draft-links with which the eyes or loops of the stop-links are adapted to come in contact, substantially as herein described.

6. In a dirt-scraper, the combination of the turnable bowl, the runners of said bowl, the draft-links, and the drag-bar, the stop-links connected at their rear ends to the bowl and having eyes or loops at their forward ends sliding on the draft-links, and the adjustable stop-collars adapted to be moved on the draft-links and set in position and with which the loops or eyes on the stop-links are adapted to come in contact, substantially as herein described.

7. In a dirt-scraper and in combination with the turnable bowl and draft-links, the stop-links sliding on the draft-links to limit the dump of the bowl and having their rear ends adjustably connected with the bowl, substantially as herein described.

In witness whereof I have hereunto set my hand.

DOCTOR FRANKLIN OLIVER.

Witnesses:
LINCOLN SONNTAG,
JOHN P. W. WENTWORTH, Jr.